Figures 2, 4:
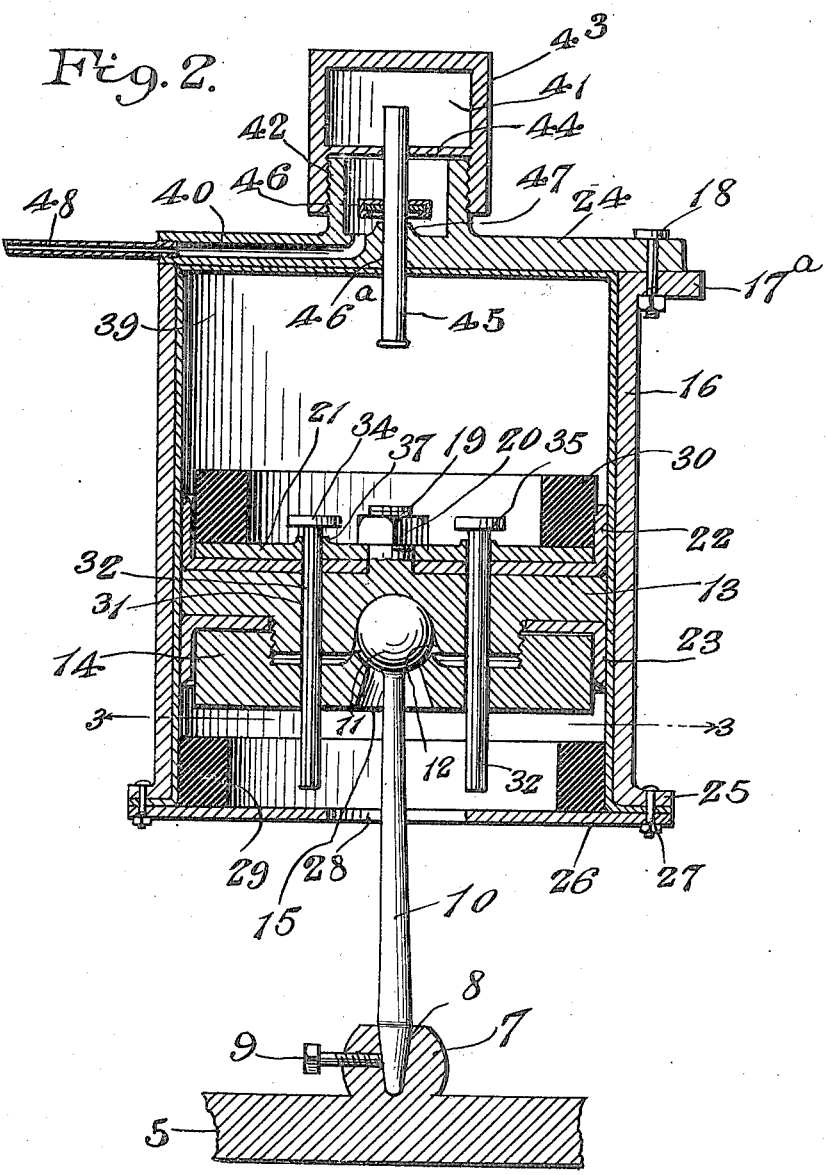

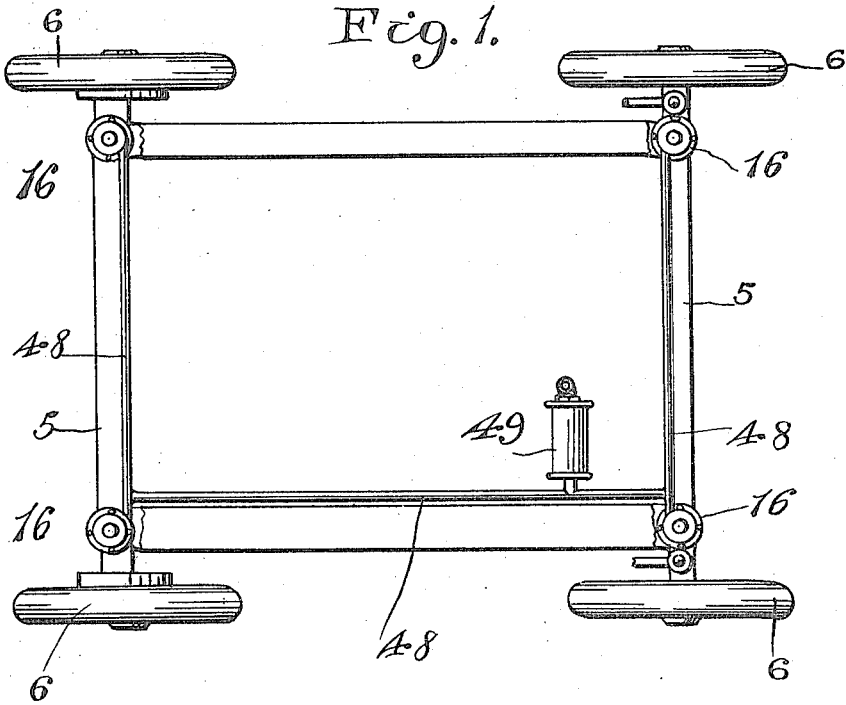
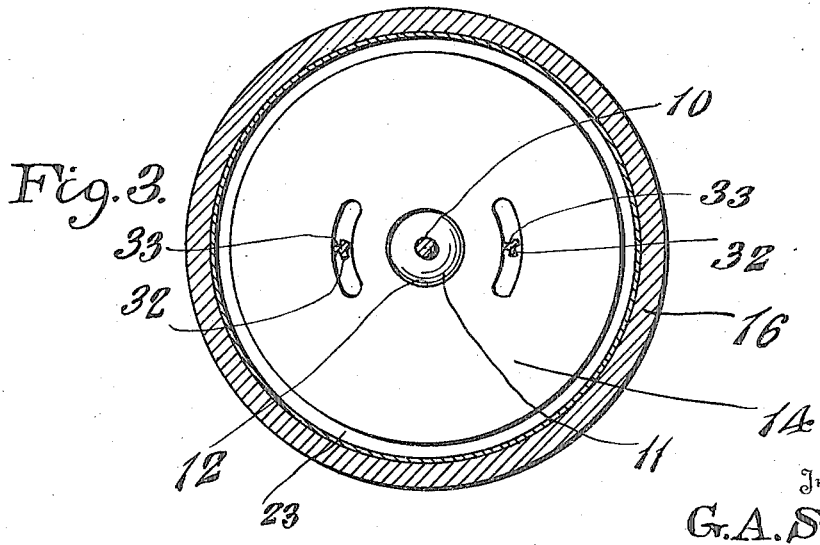

G. A. SAAL.
VEHICLE.
APPLICATION FILED MAY 26, 1914.

1,187,863.

Patented June 20, 1916.
2 SHEETS—SHEET 2.

Witnesses

Inventor
G. A. Saal.
By
Attorney

UNITED STATES PATENT OFFICE.

GEORGE A. SAAL, OF YOUNGSTOWN, OHIO.

VEHICLE.

1,187,863. Specification of Letters Patent. Patented June 20, 1916.

Application filed May 26, 1914. Serial No. 841,057.

*To all whom it may concern:*

Be it known that I GEORGE A. SAAL, a citizen of the United States, residing at Youngstown, in the county of Mahoning and State of Ohio, have invented certain new and useful Improvements in Vehicles, of which the following is a specification.

This invention relates to vehicles and more particularly to means for resiliently supporting the body of a vehicle above the axles by compressed air.

An object of the invention is the provision of a plurality of pistons attached to the front and rear axles of the motor vehicle and working within a corresponding number of cylinders secured to the under side of the body of the vehicle, and supporting the weight of the latter by compressed air.

Another object is the provision of a reservoir containing air under greater pressure than that in the cylinders adapted to be admitted to the cylinders to increase the air pressure therein when the piston is driven to the top of the cylinder by an exceptionally violent shock.

Another object is the provision of means for automatically establishing communication between the air reservoir and the cylinders when the pressure in the latter is reduced by leakage or any other cause below a predetermined value.

With these and other objects in view, the invention consists in the novel construction, arrangement and combination of parts as will be hereinafter specifically described, claimed and illustrated in the accompanying drawings, in which, Figure 1 represents a top plan view of a motor vehicle, partly broken away, showing the application of my improved cushioning apparatus thereto, Fig. 2 represents a vertical central sectional view through one of the pneumatic controlled shock absorbers, and, Fig. 3 represents a transverse sectional view on the line 3—3 of Fig. 2, and, Fig. 4 represents an enlarged detail sectional view of the valve.

Referring to the drawing in detail, wherein similar reference numerals designate corresponding parts throughout the several views, the numeral 5 indicates the front and rear axles of a motor vehicle on which the wheels 6 are rotatably mounted in the usual or any preferred manner. Adjacent the ends of each of the axles, enlargements 7 are formed thereon having downwardly tapered recesses 8 therein and provided with set screw 9 for removably securing the lower tapered ends of the piston rods 10 in vertical position. The upper end of each rod 10 is provided with an integral ball 11 movably positioned within a seat 12 formed in one of the piston parts 13 and held against removal by the other piston part 14 and suitably secured thereto. The lower part 14 of the piston is formed with an aperture 15 receiving the rod 10 and permitting the latter to move relative to the piston.

A plurality of cylinders 16 are secured to the body of the motor vehicle, not shown in Fig. 2, by suitable bolts or equivalent securing means 18, and slidably receive the piston parts 13 and 14. The top part 13 of the piston is provided with an integral upstanding threaded lug 19 carrying a nut 20 for securing the apertured top plate or disk 21 in position on the piston. Between the plate 21 and the top part 13 a ring 22 having an upwardly directed flange is secured, and between the upper and lower parts 13 and 14, respectively, a downwardly directed piston ring 23 is secured. A head 24 is secured to the upper end of the cylinder 16 and the lower end thereof is formed with an outwardly directed flange 25 to which the bottom plate 26 is removably secured by bolts 27. A central opening 28 is formed in the bottom plate 26 for receiving and permitting movement of the piston rod 10 therein. An annular cushioning element 29 of rubber or other suitable material is secured to the bottom plate 26 within the cylinders, and a second cushioning element 30 is disposed over the top plate 21 within the upwardly directed flange of the ring 22 and normally retains the latter in engagement with the inner face of the cylinders.

The top part 13 of the piston is formed with a plurality of inlet ports 31 in which are slidably mounted the valve stems 32 having longitudinal slots or grooves 33 therein to permit the air to flow freely through the ports 31. The stems 32 project a distance above the top plate 21 and are provided with heads 34 formed with downwardly and inwardly directed flanges 35 under which are secured annular washers 36 formed of leather, rubber or other suitable material and adapted to be seated over the valve seats 37 to seal the ports 31 against the exit of air therethrough. The stems 32 project a distance downwardly beneath the lower part 14 of the piston and are adapted, when said piston is in its lowermost position, to engage the bottom plate 26 of the cylinder and raise the valves 36 to permit air to pass from the chamber 39 in the upper portion of the cylinder.

The head 24 of the cylinder is formed with an inlet passage 40 communicating with a chamber 41 formed by the annular upstanding flange 42 of said head and a cap 43 threaded thereover. A spider 44 is secured within the cap 43 and provides a guide for the stem 45 of the valve 46. The stem of the valve is provided with a plurality of longitudinal grooves similar to the stems 32 whereby when the valve is unseated air is permitted to enter the chamber 39 through the opening 46$^a$ communicating the chamber 41 with the chamber 39. A suitable seat 47 is formed integral with the head 24 within the chamber 41 and is adapted to coöperate with the valve 46 to close opening 41 against the admission of air to the chamber 39. Each of the passages 40 of the four cylinders 16, illustrated in Fig. 1, is connected with a pipe 48 connected with a common reservoir or tank 49 suitably supported in the body of the vehicle and connected with the air compressor ordinarily provided on motor vehicles for maintaining the air in the reservoir under pressure exceeding the maximum pressure of the air within the chamber 39 of the cylinder 16.

In operation, downward movement of the body of the vehicle relative to the axles 5 thereof is resisted and cushioned by the air compressed within the chamber 39. The air pressure in the tank 49, pipe 48 and chamber 41 is greater than the maximum pressure of the air within the chambers 39 and therefore the valves 46 are normally retained closed. Under an excessive load or by an extremely violent shock, the body of the vehicle and the cylinders 16 are carried downwardly until the lug 19 engages the lower ends of the stem 45 and forcibly raises the valve 46 permitting the air from the reservoir 49 to enter the chambers 39 through the pipes 48 and opening 46$^a$. The increased air pressure within the chambers 39 forces the cylinders 16 and the body of the vehicle to its normal position permitting the valves 46 to move to closed position. On the rebound or upward movement of the body of the vehicle, the cylinders 16 are carried upwardly and the air pressure within the chambers 39 is relieved by the valves 35 automatically opening and permitting air to pass from the chambers 39 through the openings 31.

What I claim is:—

In a cushioning device, a cylinder, a head secured thereto, a piston slidably mounted in said cylinder, a flanged piston ring carried by said piston, an annular cushioning element engaged with said piston, inclosed by the flange of said piston ring for normally retaining the latter in operative engagement with the cylinder and adapted to engage said cylinder head to cushion the movement of said piston relative thereto.

In testimony whereof I affix my signature in presence of two witnesses.

GEORGE A. SAAL.

Witnesses:
H. A. ERNST,
H. J. WASSMAN.

Copies of this patent may be obtained for five cents each, by addressing the "Commissioner of Patents, Washington, D. C."